June 28, 1955        J. W. KAPPEN        2,711,835
MATERIAL HANDLING MEANS
Filed Jan. 21, 1949                                3 Sheets-Sheet 2
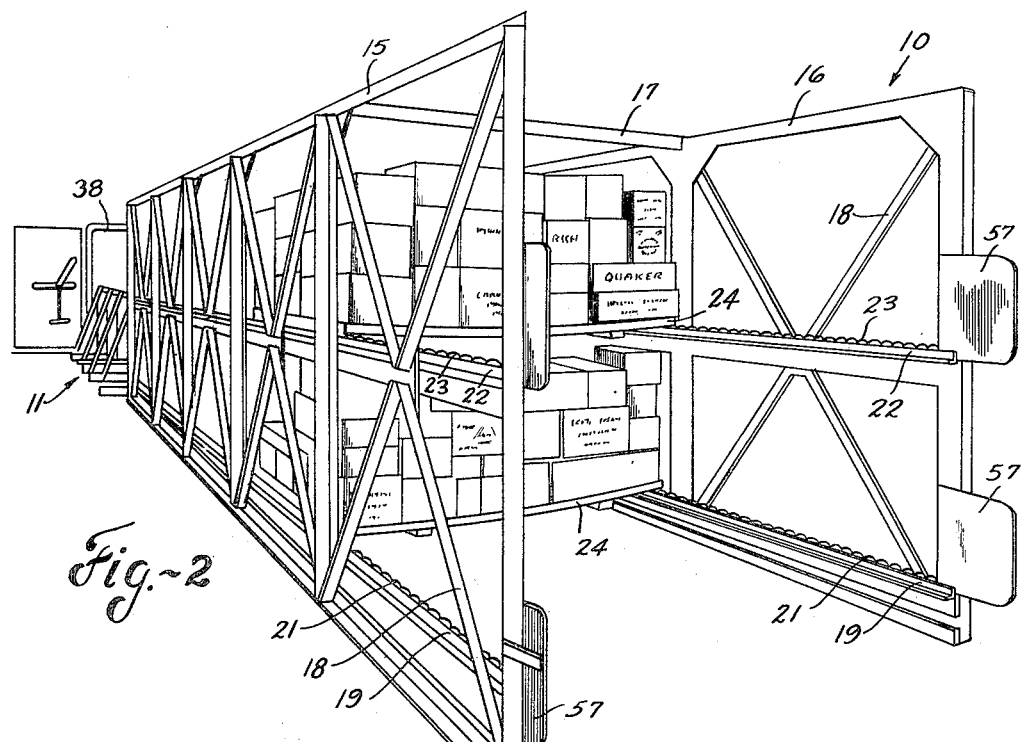
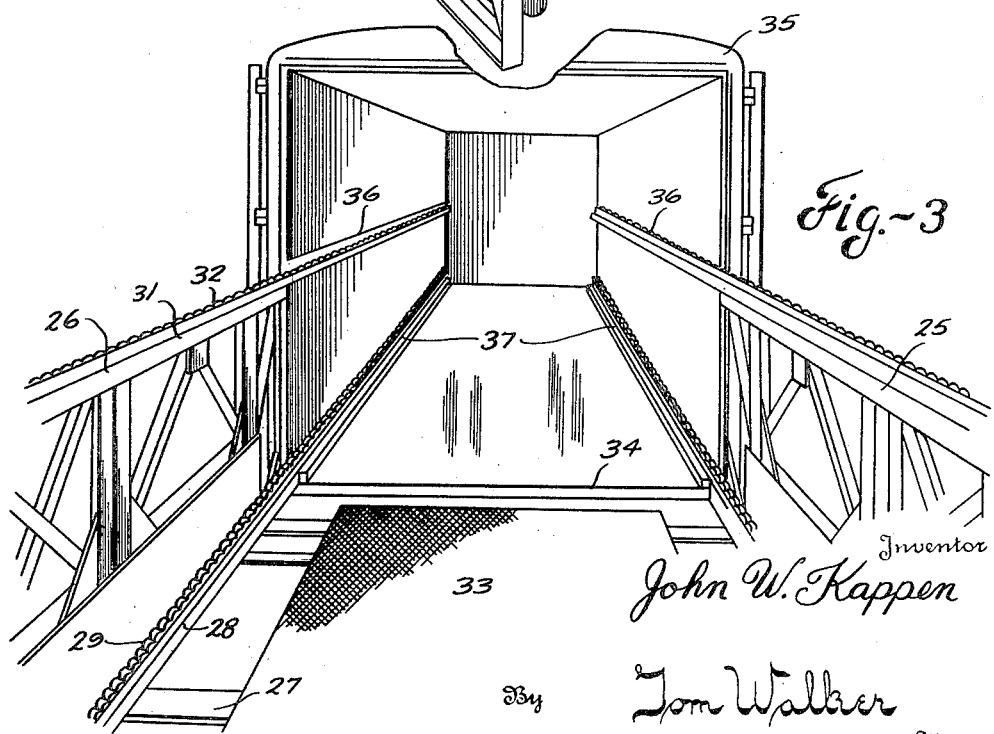
Inventor
John W. Kappen
By Tom Walker
Attorney

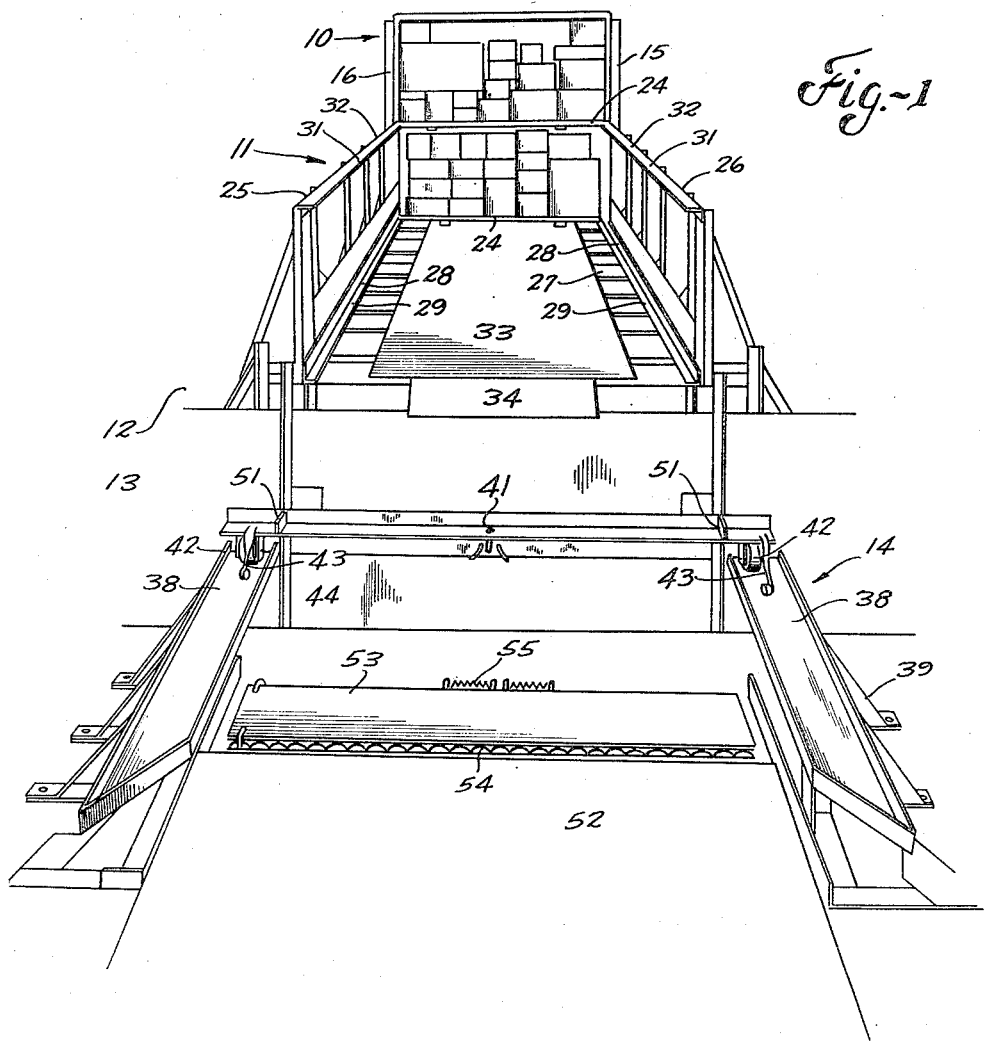

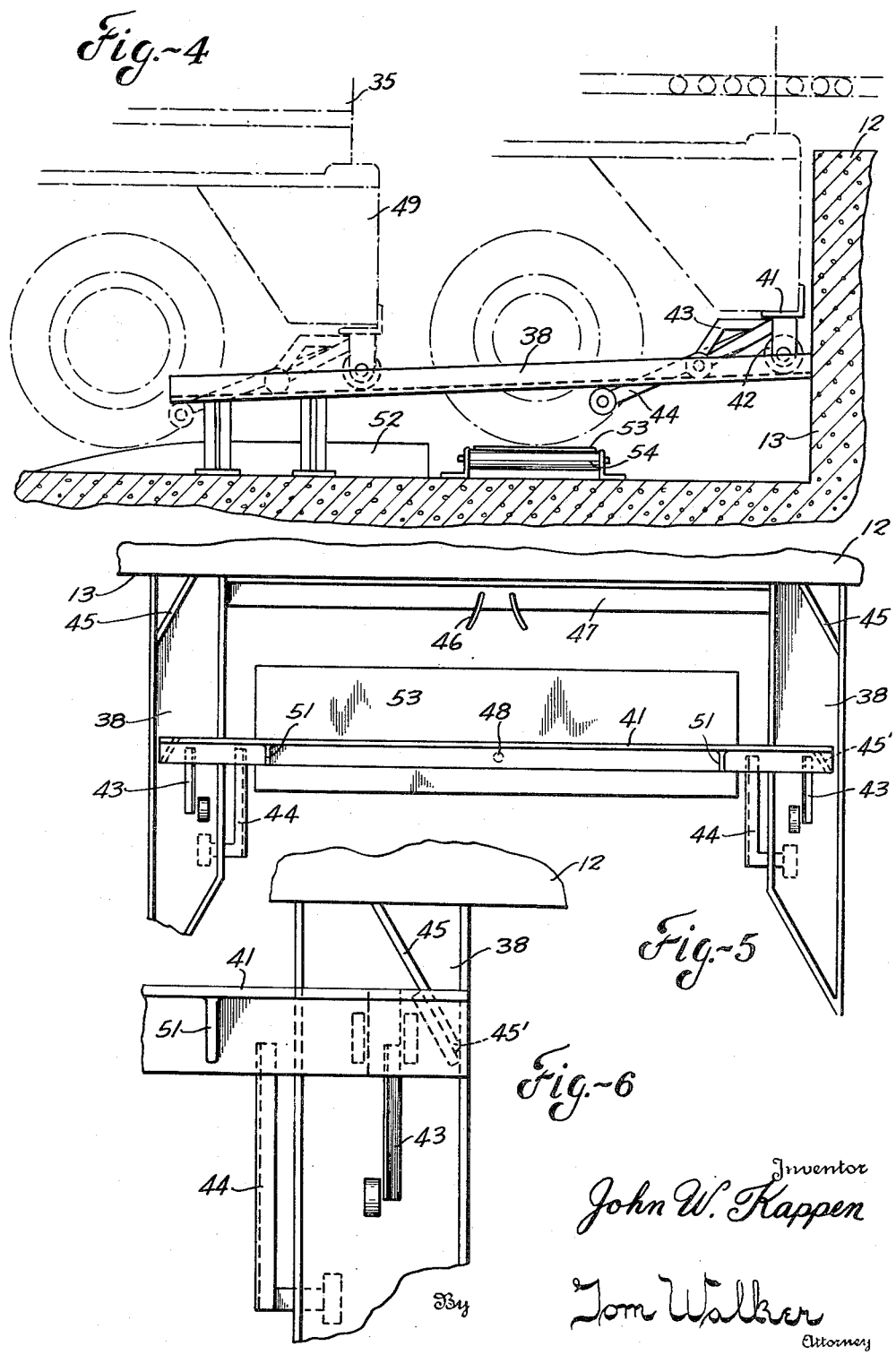

United States Patent Office 2,711,835
Patented June 28, 1955

2,711,835

MATERIAL HANDLING MEANS

John W. Kappen, Dayton, Ohio

Application January 21, 1949, Serial No. 71,820

6 Claims. (Cl. 214—38)

This invention relates to merchandise handling and transport aids used in connection with trailer trucks and the like.

The invention is susceptible of application to a variety of handling and transport work. For illustrative purposes it is here disclosed in connection with trailer trucks used to transport merchandise from a warehouse to a number of selling outlets or stores. A chain grocery store system, for example, includes a number of retail stores in a given area, all supplied with merchandise from one or more central warehouses. The goods are transported from the warehouse to the stores by trailer truck which ordinarily follows a regular schedule, stopping at the several stores in turn to unload the cartons and cases tagged or earmarked for delivery there. Such a system involves, therefore, a selection of goods from the stocks at the warehouse, loading of the goods upon the truck, transport, and selective unloading at the various destinations.

These operations have been subjected to a considerable study and investigation with the view of simplifying and speeding up the system, to the end that more efficient use may be made of the trucks and the stores be more quickly and accurately served. Heretofore it has been the practice to stack the cartons and cases one upon another in a truck which is allowed to stand at the warehouse platform while the goods are being selected and loaded. Some effort ordinarily is made to group the goods in the truck in correspondence with their points of delivery to simplify subsequent unloading, but this object even when attained does not obviate the loss of time and opportunity for error and damage produced by individual handling and bulk storage.

According to the present invention a generally new system is contemplated which involves a preselection of goods at the warehouse, temporary storage of the selected groups arranged in a predetermined order in position for loading, the simultaneous loading of all the groups into the truck without altering their separate status, retaining such status during transport, and removing the goods group by group at the points of destination. A feature of the invention resides in the use of pallets, one or more of which is stacked in the warehouse with the goods for each store. The entity of one pallet and the cartons carried thereby as a group is retained through the steps of temporary storage, loading, transport and unloading, being discontinued only when the cartons are opened in the store and the merchandise placed on the shelves. When a number of pallets have been stacked sufficient to make up a truck load, or as each pallet is stacked, they are stored upon the warehouse platform for loading, all of the loaded pallets are pushed as a unit into the truck which thus may be loaded and depart within a few minutes after its arrival. The same expeditious handling is possible at the stores where one or more loaded pallets are removed and brought into the stores, the pallets when cleared being later returned to the warehouse.

Apparatus for the most efficient practice of the system is contemplated. This includes a chute built upon the warehouse platform and conforming in size to the body of the truck. Forming a part of the chute are longitudinal anti-friction slideways, there being preferably two or more such slideways, vertically spaced so that all the available space in the truck may be used. The interior of the truck is in turn fitted with corresponding slideways. Locating means may be provided at the base of the warehouse platform to insure that the truck will assume a position in which the slideways therein and in the chute are in registry. The loaded pallets are pre-arranged in the chute with their ends resting on the slideways and with their longitudinal edges in contact with adjacent pallets. Thus when a truck has been positioned at the platform, the pallets are pushed as a unit from the chute into the truck where they are received by and supported upon the slideways therein. The work of mounting the loaded pallets in the chute and of pushing the assembly into the truck may be carried out by motive means, for example the conventional lift truck used in warehouses.

The object of the invention is to simplify the handling of merchandise and the loading thereof by means of the equipment disclosed herein, whereby such equipment may not only be economically manufactured, but will be more efficient and satisfactory in use, adaptable to a wide variety of loads, having relatively few parts and be unlikely to get out of repair.

A further object of the invention is to provide means for facilitating the handling and assembly of merchandise within a warehouse.

A further object of the invention is to provide means for efficiently and easily loading trucks or other vehicles in which such merchandise is to be transported from the warehouse.

A further object of the invention is to provide means enabling the more efficient use of trucks or other forms of transportation vehicles.

A further object of the invention is to provide means for properly aligning the transport vehicle with the warehouse loading dock.

A further object of the invention is to provide means for insuring stability of the transport vehicle during the loading thereof.

A further object of the invention is to accelerate the transportation of merchandise from point to point while reducing the probabilities of error and damage during transport.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawings, wherein is found the preferred but obviously not necessarily the only form of embodiment of the invention, Fig. 1 is an end view of the loading chutes and truck locating means at the warehouse, looking toward the warehouse platform;

Fig. 2 is a view in perspective of the loading chute, containing loaded pallets;

Fig. 3 is a view looking from the loading chute into the interior of a truck;

Fig. 4 is a view in side elevation of the truck locating means, indicating the manner of cooperation of the truck body therewith;

Fig. 5 is a top plan view of the truck locating means; and

Fig. 6 is an enlarged view of a fragment of Fig. 5, showing the action of a centering device in the truck locating means.

Like parts are indicated by similar characters of reference throughout the several views.

While the truck body shown herein for illustrative purposes is of the type disclosed and claimed in my copending application Serial No. 609,448, filed August 7, 1945, now Patent No. 2,521,727 issued September 12, 1950, the present loading equipment is not limited to use with such truck bodies, but may be used with other forms of vehicle bodies.

Referring to the drawings, the warehouse apparatus may include several sub-assemblies cooperating to the end that pallets loaded with merchandise can be quickly and easily moved from the warehouse platform into a trailer truck backed up to the platform.

As shown in Fig. 1, these sub-assemblies comprise a stationary chute 10 which may be permanently installed upon the platform rearwardly of the edge thereof in such position that the platform is usable for other types of loading and unloading when desired. Constructed and arranged to be moved selectively into cooperative relation with the stationary chute 10 is a portable chute 11, which in effect forms a continuation of the chute 10 to the edge of the warehouse platform. The platform is indicated in Fig. 1 at 12 and the wall defining the edge thereof at 13. At the base of the wall 13 is a further sub-assembly 14 constituting locating means for guiding the trailer truck into alignment with the portable chute 11.

Referring to Fig. 2, the stationary chute 10 is made up of a framework of metal bars and girders including transversely spaced rectangular frames 15 and 16. The frames 15 and 16 are interconnected by cross bars 17 at the top thereof and each frame is made into a rigid integral structure by diagonal cross members 18. The bases of the frames 15 and 16 rest directly upon and may be secured to the floor of the warehouse platform and that area of the floor between the frames is clear of obstructions for service as a runway. Adjacent the base of each frame 15 and 16 is an angle bar 19 extending throughout the length of the chute and providing a mounting for anti-friction rollers 21. In approximately the mid portion of each frame is a second angle bar 22 providing a mounting for a second set of rollers 23. The bars 19 and 22 and their associated rollers 21 and 23 provide rollerways or slideways designed to support pallets 24, some of which are illustrated as mounted in the chute 10. The spacing of the frames 15 and 16 is such that the ends of the pallets 24 may rest upon the rollers 21 and 23 and the anti-friction bearing provided by the rollers enables a pallet to be moved easily within the chute. The vertical spacing between the sets of rollers 21 and the sets of rollers 23 is such as to enable the pallets 24 each to carry a substantial load of merchandise. The extent to which the merchandise may be stacked upon the pallets is in part determined by the height of the chute 10 which corresponds approximately to the dimensions of the trailer truck. Similarly, the length of the chute 10 is designed to approximate the length of the trailer truck so that the chute may contain the maximum number of loaded pallets which may be accommodated in the truck.

The portable chute 11 as is best seen in Fig. 1 comprises a pair of side frames 25 and 26 mounted upon and interconnecting a series of cross beams 27. The cross beams 27 may rest directly upon the warehouse platform but preferably are mounted upon casters in order that the chute 11 may be moved to and from cooperative relation with the chute 10. At the base of each side frame 25 and 26 is an angle bar 28 mounting rollers 29. At the top of each side frame is an angle bar 31 mounting rollers 32. The bars 28 and 31 and their associated rollers 29 and 32 constitute rollerways or guideways corresponding to and forming continuations of the rollerways in the stationary chute 10. When the chute 11 is moved into alignment with the chute 10 the respective rollerways therein are in registry and the pallets 24 may move freely therealong as though there were in fact a continuous slideway therefor. Mounted upon the cross beams 27 is an elongated metal plate 33 constituting a runway through the chute 11. Pivoted flaps 34 at the opposite ends of the runway 33 connect the runway with the chute 10 and with the interior of the trailer truck.

In Fig. 3, a trailer truck 35 is shown backed up to the warehouse platform in a position of alignment with the chutes 10 and 11. The interior of the truck is fitted with vertically spaced longitudinal sets of rollerways 36 and 37 corresponding to and in registry with the rollerways in the chutes 10 and 11. When the truck is so positioned, therefore, the loaded pallets may be pushed directly from the chute 10 through the chute 11 and into the truck 35 where they rest upon and are supported by the rollerways 36 and 37.

The sub-assembly 14 at the base of the warehouse platform acts to insure such registry of the trailer truck with the loading chutes that motion of the pallets into the truck as above described may be carried out. As shown in Figs. 1 and 4 this mechanism comprises a pair of transversely spaced elevated tracks or rails 38 mounted upon fixed standards 39 so arranged that the rails slope upward from a point of minimum height at their outer ends to a point of maximum height at their inner ends, at which ends the rails abut the wall 13 of the warehouse platform.

Riding upon the rails 38 is a guide member 41 having a right angle shape viewed in cross section. Dependent from the bottom of the member 41 adjacent the opposite ends thereof are wheels 42 resting on the rails 38. Pairs of forwardly extending arms 43 and 44 on the member 41 have rollers thereon and respectively engage the upper and lower surfaces of the rails 38 in order that the member 41 will be stabilized against rocking motion. The sides of the rails 38 are built up to define enclosing walls which retain the guide member 41 upon the rails and restrict lateral or endwise motion thereof. The width of the rails is sufficient to permit a lateral adjustment of the member 41 within the limits defined by the built-up walls thereof. At the inner ends of the tracks 38 are abutment pieces 45 angularly disposed in such manner as to define fillets for locating and centering the member 41. Thus, as the guide member moves inwardly along the tracks 38, near the end of such motion dependent portions 45' therefor engage the fillets 45 with the result that lateral adjustment of the member 41 is effected, if needed, to center the member upon the tracks 38.

For further positive centering of the member 41 there may be used a centering device in the form of stationary divergently curved prongs 46 mounted upon a fixed cross member 47 and adapted to receive a stud 48 set in the guide member 41. As the stud 48 enters between the prongs 46 it is cammed into a position centrally thereof and so makes the desired adjustment of the member 41, the prongs 46 being so located as to obtain an exact center location for the guide member 41 upon the tracks 38.

The guide member 41 is arranged to be contacted and to be moved by the body of the trailer truck 35. To facilitate a consistent cooperation between the trailer truck and the member 41 there may be attached to the lower rear end of the truck body an abutment member 49. The member 49 depends from the body of the trailer truck a distance calculated to engage the guide member 41 when the member is at the outer end or bottom of the tracks 38. Further, the abutment member 49 is of a length to be received between and to be embraced by upstanding lugs 51 on the guide member 41 in such manner that relative shifting motion between the guide member and the truck is inhibited.

For further assurance of an accurate contacting of the guide member 41 by the truck there may be built-up between the tracks 38 a land 52 upon which the rear wheels of the truck ride. Beyond the end of the land 52 is a table 53 mounted upon anti-friction rollers 54 for motion laterally or transversely of the tracks 38. The table 53 is normally centered by springs 55 and is of a height corresponding to the height of the land 52. The construction and arrangement is such that the wheels of the truck pass from the land 52 to the table 53 at about the same time the guide member 41 reaches cooperative relation with the fillets 45 and centering prongs 46. Accordingly, any lateral adjustment of the guide member 41 which may be enforced by the centering devices is partaken of by the truck by reason of the fact that its wheels are at this time resting upon the laterally shiftable table 53.

In use of the apparatus the stationary chute 10 is utilized as a temporary storage place for the loaded pallets 24. Thus each pallet is marked or identified for a destination at a particular one of the retail stores and the cartons of merchandise to be delivered to that store are stacked upon the pallet. By means of a portable lift truck or like device the loaded pallets then are placed in the chute 10 in the inverse order of the scheduled truck stops. Thus the pallet destined for the store which is the last stop on the truck route is placed in the chute first and the pallet destined for the store which is first on the truck route is placed in the chute last. In preparing the pallets for loading, they are placed with their longitudinal edges in contact with one another to preclude or limit relative motion between them. To facilitate placement of the loaded pallets in chute 10, angularly disposed guide flaps 57 are secured at the entrance end of the chute. Such flaps effect a camming action on the ends of the pallets to align the pallets with the rollerways.

When a truck arrives at the warehouse for loading it is backed up to the platform. The portable chute 11, if not already in place, is arranged in position interconnecting the chute 10 and the interior of the trailer truck. When this has been done, a lift truck on the warehouse platform enters the rear of chute 10 and pushes upon the series of loaded pallets 24 causing them to slide as a unit along the respective rollerways in the chutes 10 and 11 and into the truck where they are received by and supported upon the corresponding rollerways within the truck. The lift truck may move freely through the chute 10 directly upon the floor of the warehouse platform and when it reaches the chute 11 rides upward upon a flap 34 to the runway 33 and therealong to the trailer truck.

In the operation of the locating assembly 14, at the base of the warehouse platform, the guide member 41 normally gravitates to the outer or lower ends of the rails 38. As the trailer truck approaches the warehouse platform, the abutment member 49 thereon contacts the guide member 41 and continued motion of the truck toward the wall 13 compels the member 41 to travel upwardly and rearwardly along the rails 38. In the course of such movement, the body of the truck is elevated, partly by reason of the rear wheels riding up upon the land 52 and partly by reason of the inclination of the tracks 38, so that when the truck reaches its extreme inward position the rollerways therein are vertically aligned with the rollerways of the chutes 10 and 11. As the guide member 41 nears the end of its travel cooperative engagement thereof with the fillets 45 and with the prongs 46 is attained and lateral adjustment of the members results. By reason of the engagement of the lugs 51 on the guide member with the ends of abutment member 49, and by reason of the fact that the rear wheels of the truck have at this time come to rest upon the shiftable table 53, the truck body is laterally adjusted in accompaniment with the member 41 and so is brought into both horizontal and vertical alignment with the rollerways in the chutes 10 and 11. When all of the parts have been so positioned the brakes on the trailer truck are applied and the truck is in condition for loading.

Not only does the truck locating and guiding assembly 14 align the trailer with the loading chute, but it also prevents depression or lowering of the trailer body at the instant the load is placed thereon. Engagement of the abutment member 49 on the trailer with the carrier member 41 removes the weight of the trailer body and any load placed therein from trailer wheels and springs. The trailer body is thereby stabilized in its adjusted position, thus preventing any movement thereof relative to the loading chute during the loading operation.

It will be apparent that modifications in the apparatus are possible within the scope of the invention. It is, for example, unnecessary that the loading chute be made up of the two assemblies 10 and 11. A single assembly, which might be portable or stationary, could be used. Further, it may be desirable directly to connect the loading chute to the truck locating assembly 14, inasmuch as these elements cooperate one with another to produce a single result. Such a connection is shown in Fig. 1, wherein tie pieces 56 extend from the frames 25 and 26 of chute 11 to the base of wall 13 and are secured to rails 38.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. In a truck loading apparatus, truck locating means including a laterally and longitudinally movable guide member engageable by the body of a truck and movable therewith longitudinally as said truck approaches a loading platform, an inclined track for said guide member, and a centering device fixed relatively to the platform for effecting lateral adjustments of said guide member.

2. In a truck loading apparatus, a loading platform, truck locating and aligning means at the base thereof, including a movable truck support engageable with the truck and movable therewith to align the truck with the platform, and a laterally shiftable anti-friction plate constructed and arranged to underlie one set of wheels of the truck to permit lateral shifting of the truck under the influence of said movable truck support.

3. Apparatus for the warehouse loading of trailer trucks and the like including a chute on the warehouse platform and opening onto the edge thereof, rollerways in said chute to support loaded pallets for sliding movement, inclined rails at the base of said platform arranged to lie alongside a trailer backed up to the platform, a transverse guide member mounted on said rails and engageable by the truck to be moved therewith longitudinally, an anti-friction device between said rails to receive the wheels of the truck, means for effecting a lateral centering adjustment of said guide member and thereby of said truck upon said anti-friction device, and rollerways in said truck brought by the longitudinal and lateral motions of said guide member into registry with the corresponding rollerways in said chute.

4. In apparatus for the warehouse loading of trailer trucks and the like, locating means at the base of the warehouse platform for the truck, including a pair of spaced rails inclining toward the platform, a transverse guide member supported on said rails for longitudinal and limited lateral motion thereon, said member being arranged to be engaged by the truck and to move longitudinally therewith upward along said rails as the truck is backed up to the platform, means cooperatively engageable with the guide member to effect a lateral centering adjustment thereof upon the rails in response to the longitudinal force applied by the truck, and means on said guide member to compel a corresponding lateral adjustment of the truck.

5. Apparatus according to claim 4, characterized by a laterally shiftable anti-friction table positioned to receive the rear wheels of the truck concomitantly with the cooperative engagement of said guide member with said centering means.

6. In a truck loading apparatus, truck locating means including a pair of upwardly inclined surfaces in relation to which a truck is advanced toward a loading platform, a truck supporting member movable on said inclined surfaces with which member the truck body is engageable as it approaches a loading platform, the construction and arrangement being such that the truck body is supported upon said inclined surfaces independently of its springs and wheels, means for guiding the truck supporting member and truck body carried thereby into predetermined position of transverse adjustment upon continued movement of the member and supported body toward the loading platform while said member and truck body are being simultaneously elevated to predetermined position by movement up the inclined surfaces, an anti-friction plate in the base of said locating means freely movable transversely thereof upon which the truck's wheels rest to permit transverse movement of the truck body in accordance with transverse movement of the supporting member, and load supporting means upon the loading platform upon which merchandise has been previously placed for movement into a truck, the construction and arrangement being such that the truck is properly aligned both vertically and transversely to receive from the load supporting means the merchandise placed thereon.

References Cited in the file of this patent

UNITED STATES PATENTS

| | | |
|---|---|---|
| 1,132,960 | Moreland | Mar. 23, 1915 |
| 1,288,462 | Alborn | Dec. 24, 1918 |
| 1,552,644 | Perin | Sept. 8, 1925 |
| 1,598,844 | Baxter | Sept. 7, 1926 |
| 1,646,759 | McCall | Oct. 25, 1927 |
| 1,816,041 | Denehie | July 28, 1931 |
| 1,894,951 | Fitch | Jan. 24, 1933 |
| 1,896,883 | Callison | Feb. 7, 1933 |
| 1,932,955 | Coppinger | Oct. 31, 1933 |
| 1,944,771 | Webb et al. | Jan. 23, 1934 |
| 2,096,958 | Clerc | Oct. 26, 1937 |
| 2,121,181 | Bayerl | June 21, 1938 |
| 2,447,559 | Bloemers | Aug. 24, 1948 |
| 2,489,869 | Dunn | Nov. 29, 1949 |
| 2,521,727 | Kappen | Sept. 12, 1950 |